United States Patent [19]

Crighton et al.

[11] Patent Number: 5,085,943
[45] Date of Patent: Feb. 4, 1992

[54] POLYPROPYLENE FILMS

[75] Inventors: Allan J. Crighton, Somerset; Blair G. W. Syme, Stockport, both of England

[73] Assignee: Courtaulds Films & Packaging (Holdings) Ltd., England

[21] Appl. No.: 372,342

[22] Filed: Jun. 22, 1989

[30] Foreign Application Priority Data

Nov. 16, 1987 [GB] United Kingdom ............... 8726814

[51] Int. Cl.$^5$ ............................................. B32B 27/00
[52] U.S. Cl. .................................... 428/500; 428/516; 525/232; 525/210
[58] Field of Search .................. 428/516, 500, 910; 525/232, 210

[56] References Cited

U.S. PATENT DOCUMENTS 3,663,488  5/1972  Kail ................................. 525/232

FOREIGN PATENT DOCUMENTS

| | | |
|---|---|---|
| 0041747 | 12/1981 | European Pat. Off. . |
| 0045580 | 2/1982 | European Pat. Off. . |
| 0171733 | 2/1986 | European Pat. Off. . |
| 0217388 | 10/1986 | European Pat. Off. . |
| 1231861 | 5/1971 | United Kingdom . |

*Primary Examiner*—Edith L. Buffalow
*Attorney, Agent, or Firm*—Bacon & Thomas

[57] ABSTRACT

This invention concerns biaxially oriented polypropylene films containing from 1 to 40 percent by weight of a hydrocarbon resin, the resin being substantially miscible with the polypropylene, and the film having a crease retention of at least 50% as measured by ASTM D920-49. The hydrocarbon resin is preferably a terpene resin, a hydrogenated synthetic resin or a compatible rosin. Crease retention values in excess of 70% have been achieved in particular by orienting the films at a temperature of at least 10 Centigrade degrees below the crystalline melting point of the polypropylene.

8 Claims, No Drawings

POLYPROPYLENE FILMS

This invention concerns polymeric films and in particular oriented polypropylene films.

Biaxially oriented polypropylene homopolymer films have shown wide acceptance as packaging materials. However, for certain applications such films do not exhibit satisfactory properties, in particular for twist wrap or other instances where crease retention or dead fold are required. Thus for twist wrap polypropylene homopolymer films have been found to be inferior to films of regenerated cellulose, the polypropylene films tending to untwist to an unacceptable degree. In some cases, untwisting can be sufficient that the wrapped article falls out of its wrapper.

It has been proposed in British Patent Specification 1231861 to produce biaxially oriented polypropylene films containing from 5 to 30% by weight of a terpene polymer, a compatible hydrogenated hydrocarbon resin, or a compatible rosin derivative, each having a softening point above 70° C., orientation in the longitudinal or machine direction being to a greater degree than in the transverse direction. Such films are said to show twist retention.

West German Offenlegungsschrift 3535472 also describes polypropylene films for twist wrap applications, the films containing from 10 to 40 weight percent of a low molecular weight terpene resin. These films are biaxially oriented and have an elastic modulus of at least 3000 MPa in both directions.

While these previous proposals appear to offer polypropylene films with twist wrap characteristics, neither provides a film which has commercially satisfactory properties.

According to the present invention there is provided a biaxially oriented polypropylene film containing from 1 to 40 percent by weight of a hydrocarbon resin, the resin being substantially miscible with the polypropylene, and the film having a crease retention of at least 50% as measured by ASTM D920-49.

Films of the present invention have good crease retention of at least 50 percent, in particular at least 60 percent, and more particularly at least 70 percent, as measured by ASTM D920-49.

In addition to good crease retention, films of the present invention have shown good twist retention, for example values of at least 1.0 as measured by the method defined in British Patent Specification 1231861 have been achieved.

The term hydrocarbon resin is used herein to refer not only to resins consisting of carbon and hydrogen only but to resins containing other atoms provided that when present such atoms do not significantly adversely affect the ability of the resins to impart crease retention to polypropylene films.

Hydrocarbon resins which can be used in accordance with the present invention can be selected from the terpene polymers, hydrogenated synthetic resins and compatible rosins disclosed in British Patent Specifications 993387 and 1231861. Hydrogenated synthetic terpene resins are usually preferred because they tend to be colorless or water-white compared with resins based on naturally occurring terpenes which tend to be yellow. In general it is preferred to use resins based on alicyclic terpenes.

The amount of hydrocarbon resin present is from 1 to 40, preferably from 10 to 25, and advantageously from 15 to 20 percent by weight based on the combined weight of the polypropylene and the hydrocarbon resin.

The polypropylene is preferably a polypropylene homopolymer having a melt flow index (ASTM 1238 at 230° C. under Condition L) of from 1 to 10 dg/min, and more preferably from 2 to 5 dg/min.

Films of the present invention are biaxially oriented, and good crease retention characteristics, in particular of at least 50% as measured by ASTM D920-49, have been achieved by effecting stretching in the transvese direction at a temperature of at least 10, preferably at least 15, and more particularly at least 20 Centigrade degrees below the crystalline melting point of the polypropylene. Such temperatures are substantially below those conventionally used in the art for orienting polypropylene film in the transverse direction. Analogous films of polypropylene without the hydrocarbon resin being present would be expected to fracture under such stretching conditions. However, conventional temperatures can be used in the machine direction.

In a preferred method of producing films of the present invention, a web of polypropylene homopolymer containing from 1 to 40 percent by weight of hydrocarbon resin is melt extruded, for example on to a chill roller, and then stretched in the machine direction, i.e. in the direction of extrusion, for example using heated rollers. Stretching is preferably effected at a temperature of from 85° to 140° C., and more preferably from 90° to 120° C. The degree of stretch is preferably from 3.0 to 8.0:1, and more preferably from 4.0 to 6.0:1.

The mono-axially oriented film is then preferably oriented in the transverse direction using a stenter. Preferred stretch ratios in the transverse direction are from 5.0 to 16.0:1, more particularly from 7.0 to 12.0:1.

If desired, films of the present invention can be provided with one or more further polymeric layers, for example to provide printable and/or heat sealable films. Such layers can be produced, for example, by coextrusion with a base web of the polypropylene containing the hydrocarbon resin. Examples of further polymeric layers which can be provided include those produced from polymers containing units derived from at least two of ethylene, propylene and but-1-ene. Other polymeric layers which can be used include polyethylene containing units derived from at least one of hex-1-ene, oct-1-ene and 4-methylpent-1-ene. Mixtures of such polymers can also be used.

Films of the present invention can include one or more additives known in the art, for example they can contain antistatic and/or slip agents. Examples of specific materials which can be included with the hydrocarbon resin and/or in a further polymeric layer include silca, glycerol monostearate, bis-ethoxylated amines, fatty acid amides, e.g. erucamide, and polydimethylsiloxanes.

It is also possible to include organic or inorganic fillers in the polypropylene used to form films of the present invention. Examples of organic fillers which can be used include polyamides and polyesters, and examples of inorganic fillers which can be used include calcium carbonate, talc, barium sulfate and clays. The filler particles can have particle sizes of from 1 to 20 microns. The filler can be present in amounts of from 1 to 30 percent by weight of the film.

The temperature stability of films of the present invention can be improved by subjecting them to heat treatment, for example at 130° to 160° C. This can be beneficial where it is desired to effect heat sealing of the films.

Other post orientation treatment steps known in the art can also be effected. Thus films of the present invention can be provided with a metal layer, for example by lamination or vapour deposition of a metal, e.g. to produce a layer of aluminum. Corona discharge treatment can be used to improve the printability of the films.

The thickness of films of the present invention is preferably from 20 to 40 microns, advantageously about 25 microns. If other polymeric layers are present, they preferably have a thickness of from 1 to 10 microns.

Films of the present invention in addition to showing good crease retention have shown increased stiffness compared with biaxially oriented polypropylene homopolymer film of the same thickness and produced under conventional processing conditions but without the hydrocarbon resin. Crease retention values in excess of 70 percent in both the machine and transverse directions (as measured by ASTM D920-49) have been achieved compared with less than 30 percent for a conventional film. In addition, rigidity as measured by BS2782 (method 232) has been observed to be almost doubled in both the machine and transverse directions compared with conventional film of the same thickness.

The following Examples are given by way of illustration only. All parts are by weight unless stated otherwise, and all melt flow index values are according to ASTM 1238 at 230° C. under Condition L.

EXAMPLE 1

A polypropylene homopolymer of melt flow index 3.0 was coextruded through a sheet die at 240° C. with a layer on each side of a random copolymer of propylene and ethylene containing 4% by weight of units derived from ethylene. The two outer layers formed about 4% of the total weight of the sheet.

The extruded three layer web was chilled to 30° C. using a conventional water cooled chill roll and water bath. The web was then heated to 100° C. using heated rollers and then stretched in the longitudinal direction by 350%. The web was thereafter heated to 160° C., and stretched by 900% in the transverse direction.

The resultant film after cooling had the properties listed in Table 1. M.D. signifies in the machine direction, and T.D. signifies in the transverse direction.

EXAMPLE 2

A polypropylene homopolymer of melt flow index 3.0 was compounded with 15 percent of a hydrogenated C-9 terpolymer of alpha-methyl styrene, vinyl toluene and indene (Arkon P125-Arakawa Chemical Co., Japan), and extruded through a sheet die at 240° C. The extruded polymer was chilled to 30° C. using a conventional water cooled chill roll and water bath. The resulting cast web was heated to 100° C. using heated rollers and then stretched in the longitudinal direction by 350%. The web was thereafter cooled, reheated to 110° C., and stretched by 900% in the transverse direction.

The resultant film after cooling had the properties listed in Table 1.

EXAMPLE 3

A flat web of the polypropylene homopolymer used in Example 1 was coextruded with a layer on each side of a random copolymer of propylene and ethylene containing 4% by weight of units derived from ethylene. The two outer layers formed about 4% of the total weight of the sheet.

After chilling and longitudinal stretching of the web as in Example 1, it was stretched by 1000% in the transverse direction by means of a stenter frame oven at a temperature of 140° C. The film was then annealed at 130° C. while allowing 8% reduction in width to improve its dimensional stability.

The resultant film after cooling had the properties listed in Table 1.

TABLE 1

| Property | | Example 1 (Comparison) | Example 2 | Example 3 |
|---|---|---|---|---|
| Thickness (micron) | | 30 | 30 | 25 |
| Rigidity (g/cm, | M.D. | 1.3 | 2.3 | 1.3 |
| BS2782 method 232) | T.D. | 2.3 | 4.0 | 2.3 |
| Elastic Modulus (MPa) | M.D. | 1400 | 2100 | 2200 |
| | T.D. | 2500 | 3600 | 3900 |
| Crease retention (%, | M.D. | 16 | 65 | 70 |
| ASTM D920-49) | T.D. | 26 | 66 | 74 |

We claim:

1. A biaxially oriented polypropylene film containing from 1 to 40 percent by weight of a hydrocarbon resin, the resin being substantially miscible with the polypropylene, and the film being sequentially biaxially oriented and having a cease retention of at least 50% as measured by ASTM D920-49.

2. A biaxially oriented polypropylene film according to claim 1, wherein the film has a crease retention of at least 60% as measured by ASTM D920-49.

3. A biaxially oriented polypropylene film according to claim 2, wherein the film has a crease retention of at least 70% as measured by ASTM D920-49.

4. A biaxially oriented polypropylene film according to claim 1, wherein the film has a twist retention of at least 1.0.

5. A biaxially oriented polypropylene film according to claim 1, wherein the hydrocarbon resin is a terpene resin, a hydrogenated synthetic resin or a compatible rosin.

6. A biaxially oriented polypropylene film according to claim 5, wherein the hydrocarbon resin is a synthetic hydrogenated resin.

7. A biaxially oriented polypropylene film according to claim 1, having at least one further polymeric layer thereon.

8. A biaxially oriented polypropylene film according to claim 1, wherein the polypropylene contains an organic or inorganic filler.

* * * * *